Patented May 22, 1945

2,376,778

UNITED STATES PATENT OFFICE 2,376,778

HEAT-SEAL SHEET MATERIAL

Ernest L. Kallander, Framingham, Mass., assignor to Dennison Manufacturing Company, Framingham, Mass., a corporation of Massachusetts No Drawing. Application August 11, 1941,
Serial No. 406,415

10 Claims. (Cl. 117—122)

This invention relates to adhesive coated sheet material of the type adapted to be activated to adhesiveness by the application of heat, and more particularly to such articles of commerce as labels, sealing tape, and various types of sheet materials designed to be applied to a variety of surfaces for the purpose of protection, identification and packaging.

In order to satisfy the demands of the trade, sheet material of the aforesaid type should have an adhesive coating which meets the following requirements: a capacity for adhesion to a large variety of surfaces, including ceramics, plastic compositions, enamel surfaces, cloth, metal and metal foils, Cellophane and the like sheet materials, coatings produced from cellulose esters and ethers, as well as different types of paper such as glassine, parchment, waxed, etc.; a softening point well above temperatures encountered in habitable climates; and a relatively low sealing temperature, preferably of the order of 200–400° F., within which range it should possess a quick tack and upon cooling to room temperature it should produce a strong bond. In addition to the foregoing the adhesive composition should be substantially colorless, odorless and tasteless, non-toxic, free from tackiness at ordinary temperatures, and a high resistance to blocking.

Adhesive-coated sheet material of the aforesaid type made in accordance with prior practices usually consists of rubber-resin-wax mixtures, but such compositions have not been generally satisfactory in that they are either too slow in adhesive activation, or require too high a temperautre, or are unduly affected by climatic temperatures, resulting in blocking when the sheets are rolled up or packed in bundles. Attempts to overcome these objectionable features either by heat treating the mixture so as to alter its physical characteristics, or by the use of synthetic resins, have met with varying degrees of success, but the use of such modified compositions has been confined to a limited number of surfaces.

On the other hand, mixtures of cyclo-rubber, wax and resin produce extremely fluid coating compositions, even at high concentrations, and hence penetrate or strike through untreated sheet materials such as paper, cloth and the like, without producing a continuous uniform film of adhesive material. When such compositions are applied to treated or impervious sheet material the resulting films lack strength, tenacity and elasticity.

The principal objects of the present invention are to overcome the aforementioned difficulties and to provide a heat sealing adhesive which satisfies the above requirements. Further objects will be apparent from a consideration of the following description wherein I have disclosed several examples of specific compositions prepared in accordance with the present invention.

I have discovered that when rubber-wax-resin mixtures are modified by the addition of a cyclized rubber, the physical characteristics of the resulting mixture have been so altered that at ordinary temperatures an adhesive coating or film prepared therefrom is relatively strong and firm, resistant to deformation or cold flow, free from tackiness, and yet relatively elastic, and at elevated temperatures of the order of 200–400° F. the coating or film not only retains a substantial degree of its strength and resistance to flow, but becomes pressure-sensitive, exhibiting an outstanding capacity to adhere to a wide range of surfaces, including such diversified types of materials as ceramics, plastics, paper and the various types of synthetic sheet materials prepared from cellulose esters, ethers, etc.

The wax may comprise any one of the solid waxes such as paraffin, beeswax, carnauba, ceresin, spermacetti, candelilla, japan, shellac, etc., as well as their synthetic equivalents, and mixtures thereof. The term "resin" likewise includes the normally solid natural and synthetic resins, and mixtures thereof, which are compatible with rubber, cyclo-rubber and wax and which have softening points preferably of the order of 60–100° C. or greater. The rubber may comprise both natural and synthetic rubber and their equivalents, including such naturally occurring substances as Hevea rubber, balata, gutta-percha, gutta-siak, gutta-kyak, pontianiak, guayule and certain wild rubbers and rubber-like resins and, in general, all straight chain polymeric substances possessing the physical characteristics of the so-called elastomers.

The term cyclized rubber or cyclo-rubber is intended to include only those compositions which result from chemical transformation of the rubber molecule by cyclization, as described by Marchionna in Latex and Rubber Derivatives, vol. III, p. 1312 et seq. Although we have found that all commercially available cyclo-rubbers are generally satisfactory in preparing adhesive compositions of the aforesaid type, the most satisfactory cyclo-rubbers are those prepared by reacting a rubber solution with chlorostannic acid or the like, or a halide of an amphoteric metal, as described in United States Patents Nos. 2,050,209 and 2,052,391, which product is sold under the trade name Pliolite, and also those prepared by reacting rubber with certain phenolic compositions in the presence of a suitable catalyst, as described in United States Patent No. 2,158,530, which product is sold under the trade name Isolac.

Another satisfactory cyclo-rubber available on the market is made by Marbon Corporation and sold under the trade name Marbon B.

The relative proportion of wax, resin, rubber and cyclo-rubber varies in accordance with the physical characteristics of the different ingredients, but in any case the proportions should come within the following range:

|  | Range | Preferred proportion |
| --- | --- | --- |
| Wax | 4–40 | 25 |
| Resin | 30–80 | 35 |
| Rubber | } 10–50 | 40 |
| Cyclo-rubber |  |  |

Although the proportion of rubber to cyclo-rubber may also vary, depending upon the type, nature and extent of pretreatment of the rubber, the ratio of rubber to cyclo-rubber should fall within the range of 1:1 to 1:3. If an unmilled rubber is employed I have found that a ratio of rubber to cyclo-rubber of approximately 1:2 is quite satisfactory, as illustrated by the following:

|  | Paraffin wax (M. P., 140° F.) | Resin or mixture of resins | Unmilled rubber | Cyclo-rubber (Pliolite or Isolac) |
| --- | --- | --- | --- | --- |
|  | Per cent | Per cent | Per cent | Per cent |
| (a) | 25 | 35 | 12 | 28 |
| (b) | 15 | 50 | 10 | 25 |

In preparing a composition in accordance with the present invention any suitable mixing apparatus such as a Bambury, Werner & Pfleiderer, or the like, with or without the use of solvents, may be employed, although I prefer to use mixed solvents such as naphtha and benzol, to which a small amount of alcohol may be added. If desired, suitable anti-oxidants and copper inhibitors may be added, as well as coloring materials such as finely ground pigments.

Where, as is preferred, the adhesive composition is dissolved or dispersed in a suitable solvent in an amount which produces the desired viscosity, the resulting solution may be directly applied to the surface of a sheet of paper or the like material and to this end any conventional coating machine may be employed.

Specific examples of compositions made in accordance with the present invention are as follows:

*Example 1*

| Paraffin wax, 140° F. M. P. | lbs | 100 |
| Chlorinated diphenyl (Arochlor 5460)[1] | lbs | 96 |
| Cumarone resin (Cumar W-1½) | lbs | 45 |
| Pale crepe rubber | lbs | 48 |
| Cyclo-rubber (Pliolite #40, unmilled) | lbs | 111 |
| Copper inhibitor, antioxidant | lbs | 1.5 |
| Benzol | gals | 51 |
| Naphtha | gals | 100 |
| Alcohol | gals | 3 |

[1] ASTM softening point approximately 212° F.–222° F.

In compounding the above ingredients the paraffin is first melted, the crepe rubber is then added, after which the benzol and resin are stirred in and the naphtha, "Pliolite" and alcohol follow, the mixture being constantly stirred until all ingredients are dissolved.

*Example 2*

| Paraffin wax, 140° F. M. P. | lbs | 100 |
| Cumarone resin (Cumar W-1½) | lbs | 140 |
| Pale crepe rubber | lbs | 48 |
| Cyclo-rubber (Pliolite #40, unmilled) | lbs | 112 |
| Copper inhibitor, antioxidant | lbs | 1.5 |
| Benzol | gals | 300 |
| Naphtha | gals | 586 |
| Alcohol | gals | 20 |

The above ingredients, as well as those given below, may be compounded in the same manner as set forth in Example 1.

*Example 3*

| Paraffin wax, 140° F. M. P. | lbs | 60 |
| Chlorinated diphenyl (Arochlor 5460) | lbs | 134 |
| Cumarone resin (Cumar W-1½) | lbs | 66 |
| Pale crepe rubber | lbs | 40 |
| Cyclo-rubber (Pliolite #40, unmilled) | lbs | 100 |
| Copper inhibitor, antioxidant | lbs | 1.5 |
| Benzol | gals | 52 |
| Naphtha | gals | 100 |
| Alcohol | gals | 3 |

It should be understood that the present disclosure is for the purpose of illustration and that the invention includes all modifications and equivalents which fall within the scope of the appended claims.

I claim:

1. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of 4 to 40 parts wax, 30 to 80 parts resin, and 10 to 50 parts of a mixture of rubber and a cyclo-rubber.

2. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of 4 to 40 parts wax, 30 to 80 parts resin, and 10 to 50 parts of a mixture of rubber and a cyclo-rubber, the ratio of rubber to cyclo-rubber being with the range of 1:1 to 1:3.

3. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of 4 to 40 parts wax, 30 to 80 parts resin, 2½ to 25 parts rubber, and 5 to 40 parts cyclo-rubber.

4. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of approximately 25 parts wax, approximately 35 parts resin, and approximately 40 parts of a mixture of rubber and a cyclo-rubber.

5. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of approximately 25 parts wax, approximately 35 parts resin, approximately 12 parts rubber, and approximately 28 parts cyclo-rubber.

6. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of approximately 25 parts paraffin wax having a melting point of the order of 140° F., approximately 35 parts resin, approximately 12 parts rubber, and approximately 28 parts cyclo-rubber.

7. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of approximately 15 parts paraffin wax having a melting point of the order of 140° F., approximately 50 parts resin, approximately 10 parts rubber, and approximately 25 parts cyclo-rubber.

8. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of approximately 100 parts paraffin wax having a melting point of the order of 140° F., approximately 96 parts chlorinated diphenyl having a softening point of the order of 212° F., approximately 45 parts cumarone resin, approximately 48 parts rubber, and approximately 111 parts of cyclo-rubber derived from the reaction product formed from rubber in solution by treatment with chlorostannic acid or the halide of an amphoteric metal.

9. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of approximately 100 parts paraffin wax having a melting point of the order of 140° F., approximately 140 parts of cumarone resin, approximately 48 parts rubber, and approximately 112 parts cyclo-rubber derived from the reaction product formed from rubber in solution by treatment with chlorostannic acid or the halide of an amphoteric material.

10. Sheet material having a thermo-adhesive coating which is resistant to cold flow, free from tackiness and which at temperatures between the range of approximately 200 to 400° F. becomes adherent to a wide range of surfaces without substantial loss of film strength and resistance to cold flow, said coating consisting essentially of approximately 60 parts paraffin wax having a melting point of the order of 140° F., approximately 134 parts of chlorinated diphenyl having a softening point of the order of 212° F., approximately 66 parts cumarone resin, approximately 40 parts rubber, and approximately 100 parts cyclo-rubber derived from the reaction product formed from rubber in solution by treatment with chloro-stannic acid or the halide of an amphoteric metal.

ERNEST L. KALLANDER.